Jan. 20, 1942.   H. T. WOOLSON ET AL   2,270,571
WHEEL SUSPENSION FOR MOTOR VEHICLES
Filed Nov. 2, 1938   3 Sheets-Sheet 3
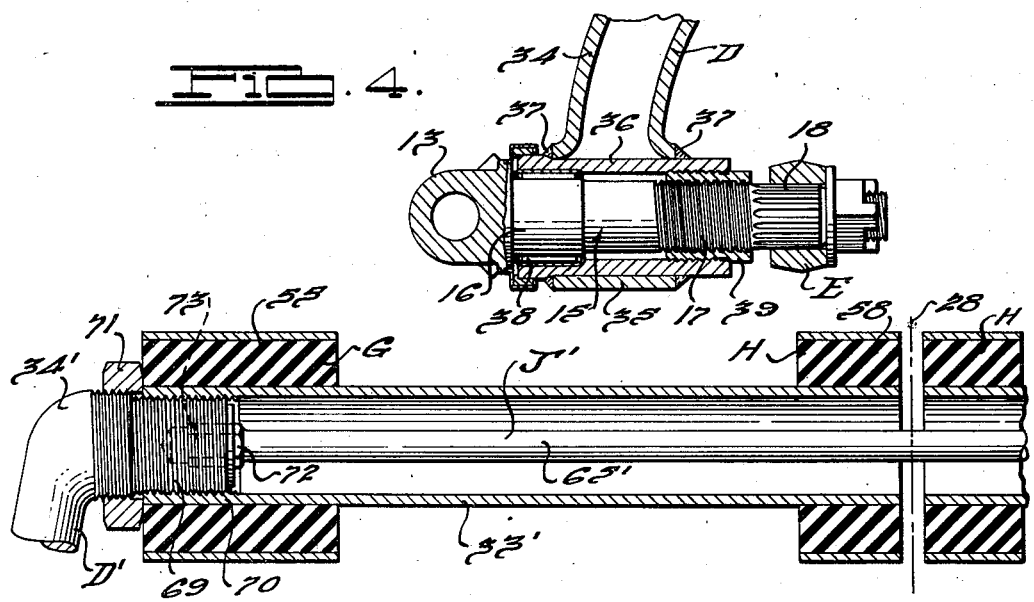
INVENTORS.
Harry T. Woolson,
Alexander G. Herreshoff,
Harold A. Hicks,
Glenn H. Parker.
BY Harness, Dickey, Pierce & Harris
ATTORNEYS.

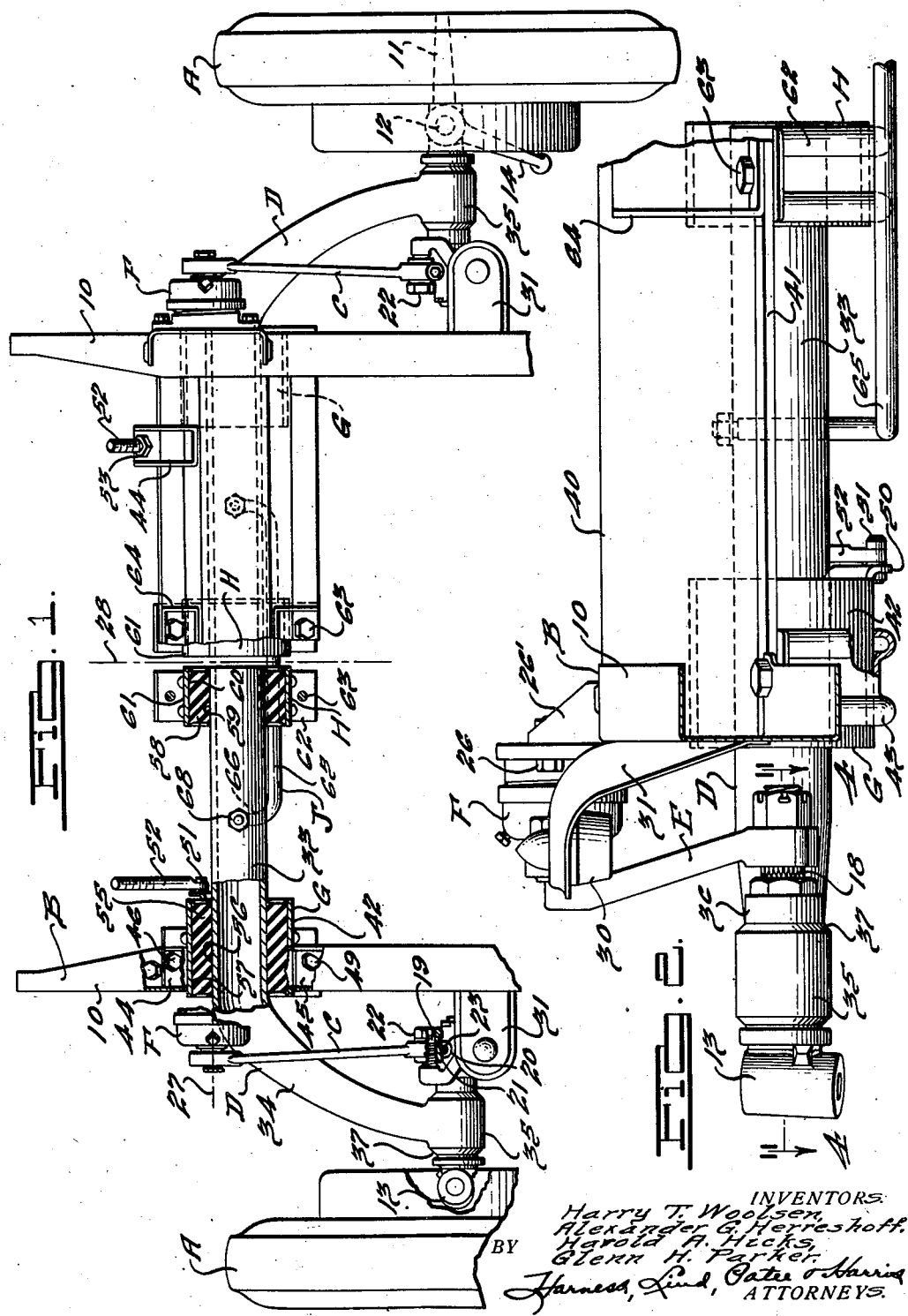

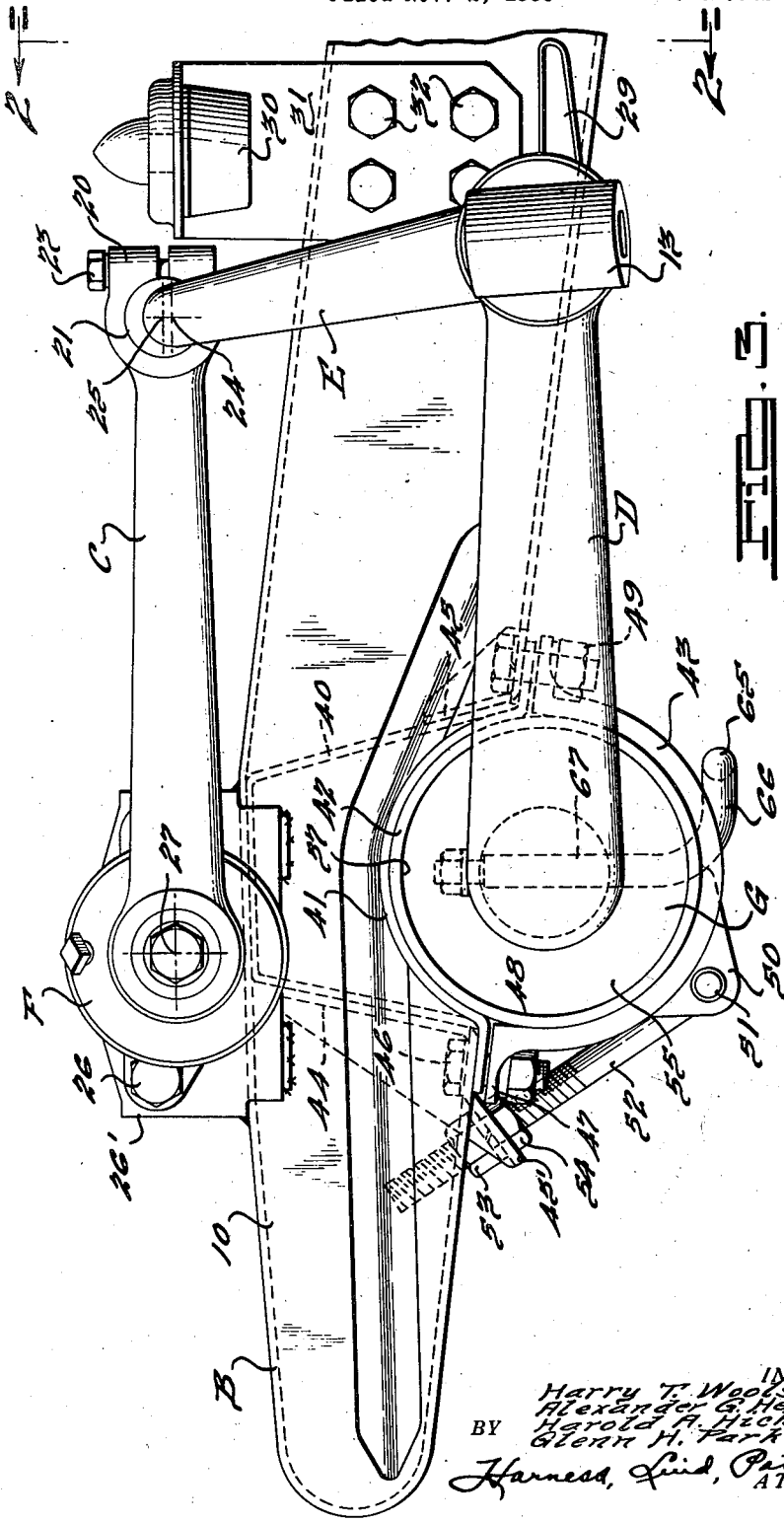

Patented Jan. 20, 1942

2,270,571

UNITED STATES PATENT OFFICE 2,270,571

WHEEL SUSPENSION FOR MOTOR VEHICLES

Harry T. Woolson, Detroit, Alexander G. Herreshoff, Grosse Pointe, Harold A. Hicks, Detroit, and Glenn H. Parker, Royal Oak, Mich., assignors to Chrysler Corporation, Highland Park, Mich., a corporation of Delaware Application November 2, 1938, Serial No. 238,421

17 Claims. (Cl. 267—21)

This invention relates to motor vehicles and refers more particularly to improvements in wheel suspensions therefor.

One object of our invention is to provide a wheel suspension of the independently sprung type affording improved riding qualities, simplification in the operating parts and substantial reduction in the cost of manufacture and assembly.

A further object is to provide independent suspension for a pair of vehicle ground wheels incorporating a simplified and directly acting stabilizer or anti-sway device for minimizing body roll and exercising a controlling action on the rising and falling movement of each of the ground wheels relative to the other.

Another object of our invention is to provide an independent wheel suspension having improved stability and quietness of operation in controlling the forces acting between the ground wheels and the vehicle frame.

Further objects of our invention are to provide an independent wheel suspension comprising a parallelogram system of improved construction and operation.

Still further objects and advantages of our independently sprung wheel suspension over prior suspensions are: a material saving in weight, cost and reduction of unsprung weight; an arrangement of suspension and frame cross member which does not interfere with engine installation and which will permit of a shorter wheelbase vehicle with a decrease in weight; elimination of harshness and road noise by absorbing fore and aft as well as vertical shocks between the wheel and vehicle frame structure; an arrangement accommodating large wheel displacement before striking the limiting rubber bumpers; simplification of the frame side rails and front cross member; reduction in the number of pressure lubricators; and improved wheel geometry during wheel deflections decreasing tire wear.

In carrying our the objects of our invention we preferably provide an oscillatory wheel carrying arm structure for each of the wheels, this arm structure having a frame supported portion and a wheel carrying portion. The frame supported portion extends generally transversely of the vehicle and is connected to the frame through one or more annuli of deformable torsionally resisting material, such as rubber composition, thereby providing torsion springing units which support the frame and which yieldingly resist rising and falling movements of the associated wheels.

Each torsion unit preferably has its rubber annulus formed with concentric inner and outer cylindrical surfaces respectively connected with the frame supported arm portion and with the frame so that the annulus is torsionally stressed. The torsion units are also arranged to accommodate limited displacement of the arm structure in all directions to effectively dampen and absorb wheel shocks against transmission thereof to the vehicle frame structure.

The mounting for each wheel is also preferably arranged so that each frame supported arm portion is yieldingly supported at points widely spaced transversely of the frame structure to effectively brace the wheel against undesired lateral displacement.

Another object of our invention is to provide a simplified and improved arrangement of clamping or securing the torsion units with the frame structure and this arrangement may embody means for rotatably adjusting the outer surfaces of the rubber annuli relative to the inner surfaces for regulating the height of the frame from the ground by varying the torsional stress in the rubber annuli.

In order to add stability to the suspension, each oscillatory wheel carrying arm structure preferably has associated therewith a second frame pivoted arm and an upright member completing the parallelogram system. Further features of our invention reside in a novel arrangement for adjusting the caster angle of a steerable ground wheel and a shock absorber in the parallelogram system.

An additional object of our invention is to provide a novel parallelogram suspension for steerable ground wheels and incorporating an improved arrangement for journalling an individual axle member on a parallelogram arm structure for efficient transmission of wheel loads and axial thrusts.

Additional features of our invention reside in the novel combination and arrangement of parts more particularly hereinafter described in detail and claimed, reference being had to the accompanying drawings in which:

Fig. 1 is a top plan view of the motor vehicle wheel suspension with parts thereof broken away.

Fig. 2 is a sectional elevational view taken as indicated by line 2—2 of Fig. 3 and illustrated a typical wheel suspension.

Fig. 3 is a side elevational view of the vehicle showing one of the wheel suspensions shown in Fig. 1.

Fig. 4 is a sectional plan view taken as indicated by line 4—4 of Fig. 2 and illustrating the support for the individual axle member.

Fig. 5 is a view generally similar to Fig. 1 but showing a modified construction for the oscillatory wheel carrying arms and stabilizer.

Fig. 6 is a side elevational view of the Fig. 5 modification.

Fig. 7 is a top plan view partly in section to show the pivotal support for the upper guide arm.

Referring to the drawings, we have illustrated our wheel suspension system in connection with a pair of front steerable ground wheels A, each of which is adapted to be supported and guided for rising and falling movement independently of the remaining ground wheels of the vehicle. The vehicle frame structure B may be formed as a structural part of the body or may be in the nature of a chassis adapted to mount the body and comprises the pair of longitudinally extending channeled side members 10 for mounting the wheel supporting and guiding means.

Each of the wheels A is rotatable in the usual manner on a spindle 11 swivelly connected for steering movements by a king pin at 12 on a king pin receiving boss 13. Each spindle has a steering arm 14 for imparting steering movement to the associated wheel by any suitable type of steering mechanism.

The king pin boss 13 (Fig. 4) is carried at the outer end of an independent axle member 15 which has its axis extending inwardly as an extension of the axis of the associated spindle 11 when the ground wheels are positioned as in Fig. 1, each axle 15 therefore extending in a direction transversely of the frame structure B. Inasmuch as the mounting means for the wheels A are similar to each other, the description will, for the most part, be limited to the mounting for one of the wheels.

Intermediate the length of the axle member 15, the latter is formed with a cylindrical bearing portion 16 and a threaded portion 17, the inner end of the axle being serrated at 18. The parallelogram system comprises upper and lower oscillating wheel carrying arm structures C and D respectively, each of these arm structures extending generally longitudinally of the vehicle and being adapted for pivotal support on the frame structure B at their forward ends. The rear ends of the arm structures C and D are pivotally connected by an upright member E which preferably extends upwardly from the arm structure D.

The upright member E has its lower end engaged with the serrations 18 of the axle member 15 so that this upright member is fixed against movement with respect to the axle member. The upright member has its upper end portion return-bent and terminates in an inwardly extending threaded shank 19 positioned generally above the lower end of the upright member. The rear end of the upper arm structure C has a yoked terminal 20 adapted to receive an eccentric bushing 21 formed with internal threads pivotally engaging the threads of shank 19. The eccentric bushing is formed with an inner head portion 22 accommodating rotative adjustment of the bushing within the portion 20 of arm C. A fastener 23 extends through the yoke portions of arm C and is adapted to releasably hold the bushing 21 in any desired position of rotative adjustment with respect to arm C. In Fig. 3 the axis of shank 19 is indicated at 24 while the axis of bushing 21 is indicated at 25, it being apparent that when the fastener 23 is released, the bushing 21 may be rotated at the headed portion 22 thereby swinging the upper end of upright member E in a direction fore and aft of the vehicle so as to rotate the axle member 15 on its axis and thus vary the setting of the caster angle of the wheel 9 at the king pin 12. In any position of adjustment, the fastener 23 may be secured to hold the bushing 21 against undesired rotation with respect to arm structure C.

The forward end of arm structure C is pivotally supported by the frame structure through the intermediary of an hydraulic shock absorber F of any suitable well known "rotary type." The body portion of the shock absorber is secured by fastener 26 to a support bracket 26' which is suitably secured as by welding to the frame side member 10. The pivotal support thus formed accommodates oscillation of the arm structure C about an axis 27 which extends generally transversely of the frame structure B and in this instance perpendicular to the vertical longitudinal mid-plane 28 of the motor vehicle.

In order to limit upward movement of the wheel A relative to the frame structure B, the upright member E carries a rearwardly projecting abutment 29 adapted to strike a rubber bumper 30 carried beneath the supporting plate 31 which is secured by fastener 32 to the side member 10.

The arm structure D is of a hollow build-up construction comprising a tubular frame supported portion 33 which extends generally transversely of the frame structure B and in this instance has its axis perpendicular to the aforesaid plane 28. The arm structure D is also formed with a wheel connecting portion 34 which is hollow and which extends longitudinally of the frame structure and laterally outwardly therefrom, thus forming a crank-like portion offset rearwardly from the frame supported portion 33. The outer end portion 35 is hollow and cylindrical for receiving a cylindrical sleeve 36 welded to the portion 35 as indicated at 37.

The arm structure D is adapted to take the vertical loads as well as the lateral loads acting between wheel A and frame structure B, leaving the arm structure C to function chiefly as a guide member for the axle 15 in maintaining the caster angle of the king pin 12 constant during rising and falling movement of the ground wheel A. The arm structure C also functions to take the brake thrust of the associated ground wheel, as will be readily apparent.

The sleeve 36 rotatably journals the associated axle member 15 by a bearing 38, preferably of the anti-friction roller type at the bearing portion 16. A second journal bearing is formed by engagement of the threads 17 with the internal threads of a bushing 39 which is suitably fixed to the sleeve 36, thereby forming a structural part of the arm structure D. Lateral thrusts of the associated ground wheel A are taken up at the threads 17, thereby relieving the end friction bearing 38 of lateral thrusts, the threads 17 also functioning to assist the bearing 38 in journalling the axle 15 in the sleeve 36 and in transmitting the vertical loads between the ground wheel and the frame structure.

We have provided a suspension system wherein each arm structure D has its oscillation resisted by one or more torsionally acting supporting units, each being preferably formed of a body of yielding deformable material and so arranged as to "float" the arm structure to yieldingly resist displacement thereof in directions both axially of the frame supported portion 33 as well as transversely of this axis of oscillation for the arm structure D. In the present instance we have provided a pair of transversely spaced torsion units associated with each arm structure D in such a manner as to provide a high degree of stability for each wheel A thereby preventing undesired displacements of the wheel while at the same time effectively dampening shocks and vibrations which tend to produce harshness between the ground wheel and frame structure.

In the present instance each arm has associated therewith the transversely spaced torsion units G and H, the unit G being supported at a side frame member 10 while the unit H is carried adjacent the mid-plane 28 by mounting on a cross member structurally connecting the side frame members 10. With such an arrangement lateral thrusts at a ground wheel A tend to fulcrum the associated arm structure D about the unit G, the unit H functioning to resist displacement of the frame supported portion 33 transversely of the oscillatory axis thereof. Each of the units G and H is also arranged to yieldingly resist oscillation of an associated arm structure D about the axis of the arm portion 33 as well as movement thereof in the direction of the axis of oscillation. The units G and H furthermore support the load of the frame structure on the associated ground wheel A and thereby provide for springing the motor vehicle on the wheels in lieu of more conventional systems employing coil or leaf load supporting springs.

In order to laterally brace the side members 10 and to strengthen the frame structure at the regions of support for the arm structures C and D, we have provided a transversely extending front cross member 40 for the frame structure B, this cross member being of channeled construction welded in position where the outer ends of the cross member intersect the respective side members 10. The bottom of the cross member 40 is closed to form a boxed-in structure by reason of the transverse reinforcing member 41 which extends across the frame structure and which is arched to provide a cavity for seating the outer cylindrical sleeve 42 of the torsion unit G. At the location of this unit an arched clamping member 43 is provided to act in conjunction with the reinforcing member 41 to embrace the sleeve 42. In order to further reinforce the frame structure at the point of loading at the unit G, we have provided channeled reinforcing plates 44 and 45 preferably welded in position respectively at the front and rear faces of cross member 40, the reinforcement 44 having a forwardly extending flange 45'. A fastener assembly 46 secures together the forward end of clamping member 43 and the frame reinforcement 41 at the respective flanges 47 and 48, as best seen in Fig. 3. Associated with the plate 45 there is provided a second fastener assembly 49 which likewise secures the rear flanged portions of frame reinforcement 41 and clamping member 43 so that when the clamping assemblies 46 and 49 are tightened, the sleeve 42 is securely held in place against any movement with respect to the frame structure B.

The sleeve 42 projects inwardly beyond the clamping member 43 and is formed with the downwardly extending lug 50 pivotally secured at 51 with a threaded rod 52 which projects through the flange 45' and is rotatably engaged on opposite sides to this flange by the adjusting clamping nuts 53 and 54. By loosening the clamping assemblies 46 and 49, the nuts 53 and 54 may be adjusted to move the rod 52 in the direction of its length and thereby effect rotative adjustment of the sleeve 42 in order to vary the torsional setting of unit G as will presently be more apparent.

The unit G comprises an annular body of resilient deformable material 55 preferably of rubber composition having its inner and outer cylindrical surfaces 56 and 57 respectively secured as by vulcanizing with the arm portion 53 and sleeve 42. The rubber body 55 is preferably molded under high pressure and heat to form the assembled unit G. It will be apparent that the body 55 will torsionally resist oscillation of arm D in supporting the load of frame on the ground wheel and also in yieldingly resisting rising and falling movement of the ground wheel with respect to the frame. Displacements of arm portions 33 in the direction of its axis of oscillation as well as transversely thereto will also be yieldingly resisted by the rubber body 55 acting in longitudinal shear for displacement of arm portion 33 in the direction of its axis and in tension and compression when arm portion 33 tends to be displaced transversely to its axis. In order to regulate the initial setting of the torsion unit G and thereby regulate the amount of relative movement of the frame structure and ground wheel under normal loaded conditions, the adjusting means at the threaded rod 52 may be utilized to rotatably adjust the outer sleeve 42 with respect to the arm portion 33 thereby either elevating or lowering the front end of the frame structure B with respect to the ground wheels A.

The unit H comprises a second annular body of yielding torsionally-resisting material 58, preferably of rubber composition, having its inner and outer cylindrical surfaces 59 and 60 respectively vulcanized as before to the arm portion 33 and the inner end thereof adjacent plane 29 and to the outer cylindrical sleeve 61 which, as before, is secured rigidly to the frame structure by seating in the cross member 41 being clamped in position by an arched clamping member 62 secured at its opposite ends by a fastener 63. A channel reinforcing member 64 is also preferably associated with the opposite faces of the cross member 40 at the region of unit H to stiffen the cross member at this point of loading.

We have also provided an improved and simplified means acting as a stabilizer or sway-eliminator which yieldingly resists relative rotation of the two arm portions 33 resulting, among other things, in keeping the frame structure and vehicle body on an even keel especially when the vehicle is rounding a curve. The stabilizer furthermore has a controlling influence on the two steering ground wheels when these wheels have relative vertical displacements although when the wheels rise and fall together, the stabilizer does not have any controlling function between the wheels.

The stabilizing means comprises a torsion bar J having a body portion 65 extending parallel to the common axis of oscillation of the arm portions 33, this body portion 65 being disposed closely adjacent the arm portions 33 and bridging the space between adjacent units H. At its opposite ends the body portion 65 is provided with the forwardly extending portions 66 which terminate in the parallel upwardly-bent portions 67 which respectively extend diametrically through the arm portions 33 and which are secured thereto by the fasteners 68. The stabilizing means is therefore directly connected with the arm portions 33, the pins 67 being respectively disposed between the associated torsion units G and H. It will be apparent that rotation of one arm portion 33 relative to the other will be yieldingly opposed by torsionally stressing the body portion 65 of the stabilizer J in order to attain the desired functioning of the stabilizing means.

In the operation of the wheel suspension it will be apparent that each ground wheel A is arranged for steering about its king pin at 12, the parallelogram system accommodating rising and falling movement of each ground wheel relative to the remaining wheels of the vehicle, the arm structure D taking the vertical loads as well as the lateral loads acting between the associated ground wheel A and the frame structure B while the arm structure C, in conjunction with the upright member E, takes the brake reaction at the associated ground wheel and also maintains the wheel caster angle at king pin 12 constant. This caster angle may be readily adjusted by rotatably setting the eccentric bushing 21 with respect to the arm C.

Rising and falling movement of a ground wheel A is yieldingly resisted by the torsion units G and H of the associated arm portion 33, the shock absorber F acting to control relative displacement of the ground wheel with respect to the frame structure. The rubber bodies 55 and 58 respectively associated with units G and H torsionally resist oscillations of arm portion 33 and sustain the weight of the frame on the associated wheel. The rubber bodies also serve to suspend the associated arm structure D in a yielding manner so as to resist displacement of this arm in all directions while preventing the transmission of shocks and vibrations between the ground wheel and frame.

The stabilizing means J serves to control relative displacements of the ground wheels A and to maintain the frame structure and body on a substantially even keel when rounding a curve, and at other times. Lateral thrusts on a ground wheel A tend to fulcrum the wheel-carrying arm structure D about the unit G, undesired displacement being prevented by the unit H which is spaced sufficiently from the unit G to provide the desired stability to the wheel suspension.

Referring now to Figs. 5–7, we have illustrated a modified form of our invention wherein we have arranged the pivots of the upper and lower wheel carrying arms directly above each other instead of being longitudinally offset as in Fig. 3. In our modified arrangement we have also provided a somewhat different construction for the lower arm structure wherein the frame supported portion is formed separately from the wheel carrying portion thereby somewhat facilitating the manufacture of the torsion units. In addition we have substituted a yielding pivotal support for the forward end of the upper arm structure, instead of the hydraulic shock absorber hereinbefore referred to.

Referring to Fig. 5, the structure illustrated represents the arrangement for a typical ground wheel, it being understood that a corresponding structure is provided for use with the opposite ground wheel, this arrangement being readily used in the Fig. 1 assembly as a substitute for the arm structures D. In Fig. 5 the corresponding wheel-carrying arm structure D' now has its wheel connecting portion 34' of solid construction terminating in a transverse threaded shank 69 engaging the internal threads on the outer end portion 70 of the tube 33'. This tube is secured as a structural unit with the arm structure D', as by a clamping member 71 engaging threaded shank 69 so that, in effect, the tube 33' forms the frame supported portion of the arm structure D' in a manner corresponding with the aforesaid portion 33 of the arm D.

In Fig. 5 the same torsion units G and H, as aforesaid, operate between arm structure D' and the vehicle frame structure but in Fig. 5 the rubber bodies 55 and 58 are now vulcanized to the tube 33', such arrangement facilitating the formation of the torsion units as a separate assembly with the tube, the latter being secured to the arm portion 34' for installation on the vehicle.

We have also illustrated a still further simplified arrangement of stabilizer means J' which now comprises a torsion bar having its body portion 65' co-axial with the axis of oscillation of the two associated frame supported portions 33' of the arm structures D', it being understood that the torsion bar 65' extends for connection to the wheel at the right hand side of the vehicle in a manner similar to that illustrated in Fig. 5 in connection with the left hand wheel mounting. Each end of the stabilizer 65' is formed with a polygonal face 72 engaging in a correspondingly formed recess 73 at the axis of the shank portion 69 so that the stabilizer bar 65' extends directly between the pair of arms D' and functions in a manner previously described in connection with the stabilizer means J.

Referring to Figs. 6 and 7, the upper arm structure C' now has its forward end clamped at 74 to a bushing 75 which has internal threads engaging the threads of the support member 76 thereby accommodating pivotal movement of the inner end of the arm structure C'. The support member 76 is rigidly mounted in a plate 77 which has a longitudinally extending face 78 vulcanized to the rubber body 79.

The rubber body 79 has an annular outwardly extending portion 80, a support bracket 81 being secured by fasteners 82 to a frame side member 10 and having an upper support portion 83 vulcanized to the rubber body 79 including the annular portion 80 thereof. Thus the support portion 83 has a face 84 thereof extending parallel with the face 78 of the plate 77, the support member 83 having a cylindrical opening 85 to which the portion 80 of the rubber body is vulcanized. By reason of this arrangement, the arm structure C' is insulated from the frame structure against shock and vibration of transmission, the support member 76 pivotally supporting the arm structure C'. Displacement of the arm structure C' in the direction of its length places the rubber body 79 under shear while displacement of the arm structure laterally inwardly or outwardly places the rubber body under tension or compression so that, in effect, the forward end of the arm structure C' is supported to accommodate universal movement of the support member 76. This arrangement lends itself to convenient manufacture in that the rubber body 79 may be molded and vulcanized as a unit assembly with the members 77 and 83 and thereafter assembled as illustrated in Fig. 7, a head 86 for the support member 76 being provided to hold this support member in the desired relationship with respect to the plate 77.

We do not limit our invention, in the broader aspects thereof, to any particular combination and arrangement of parts such as shown and described for illustrative purposes since various modifications will be apparent from the teachings of our invention and scope thereof as defined in the appended claims.

We claim:

1. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a frame supported portion extending generally transversely of said frame structure, means comprising a body of deformable material for mounting each of said supported portions on said frame structure for yieldingly resisting oscillation of each supported portion about a common axis extending generally transversely of said frame structure, and stabilizer means comprising a torsion bar having a body portion disposed adjacent said axis of oscillation, said torsion bar having opposite end portions extending at an angle from said body portion for connection respectively with the supported portions of said oscillatory arm structure.

2. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a frame supported portion extending generally transversely of said frame structure, means comprising a body of deformable material for mounting each of said supported portions on said frame structure for yieldingly resisting oscillation of each supported portion about a common axis extending generally transversely of said frame structure, and stabilizer means comprising a torsion bar disposed parallel to and spaced from said axis of oscillation and having its opposite ends respectively fixed to move with said oscillatory arm structures.

3. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a frame supported tubular portion extending generally transversely of said frame structure, means for mounting each of said tubular portions on said frame structure for oscillation about a common axis extending generally transversely of said frame structure, and stabilizer means comprising a torsion bar having a body portion disposed outside of said tubular portions and parallel to said axis of oscillation and having end portions angled from said body portion and respectively extending transversely through said tubular portions for operative connection thereto.

4. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a frame supported tubular portion extending generally transversely of said frame structure, means for mounting each of said tubular portions on said frame structure for oscillation about a common axis extending generally transversely of said frame structure, and stabilizer means comprising a torsion bar disposed adjacent said axis of oscillation and having end portions respectively projecting transversely through said tubular portions for yieldingly connecting said arm structures.

5. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a frame supported portion extending generally transversely of said frame structure, means comprising a pair of torsionally active bodies of deformable material surrounding and operally connected to each of said supported structures for mounting each of said supported portions on said frame structure to yieldingly resist oscillation of each supported portion about a common axis extending generally transversely of said frame structure, the bodies of each pair being spaced from one another along said axis of oscillation, each of said bodies having a pair of surfaces fixed against movement relative to said frame structure and one of said supported structures respectively, and stabilizer means connecting the supported portions of said oscillatory arm structures to yieldingly resist relative oscillation thereof.

6. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a frame supported portion extending generally transversely of said frame structure, means comprising a pair of bodies of deformable material for mounting each of said supported portions on said frame structure to yieldingly resist oscillation of each supported portion about a common axis extending generally transversely of said frame structure, the bodies of each pair being spaced from one another along said axis of oscillation, and stabilizer means comprising a torsion bar having a body portion disposed adjacent said axis of oscillation, said torsion bar having opposite end portions extending at an angle from said body portion for connection respectively with the supported portions of said oscillatory arm structures at a point between the pair of bodies associated therewith.

7. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a frame supported portion extending generally transversely of said frame structure, and means comprising a pair of torsionally active bodies of deformable material for mounting each of said supported portions on said frame structure to yieldingly resist oscillation of each supported portion about a common axis extending generally transversely of said frame structure, the bodies of each pair being spaced from one another along said axis of oscillation, the innermost bodies of each pair being axially spaced from one another and said frame supported arm portions having their inner ends axially spaced relative to each other so as to accommodate displacement of each arm portion axially inwardly without thrust transmission to the other arm portion.

8. In a motor vehicle having a longitudinally extending frame structure and a road wheel disposed adjacent one end of the frame structure, means associated with said wheel and frame structure for supporting and guiding said wheel for rising and falling movement independently of the remaining wheels of the vehicle, said supporting and guiding means including an oscillatory wheel carrying arm structure having a frame supported portion extending generally transversely of said frame structure and a wheel connected portion offset from said frame supported portion in a direction generally longitudinally of said frame structure, and means for mounting said frame supported portion on said frame structure for yieldingly resisting oscillation of said supporting portion about an axis extending generally transversely of said frame structure, the last said mounting means comprising a pair of annular bodies of deformable torsionally resistant material surrounding said frame supported portion in spaced relationship for resisting displacement of said frame supported portion transversely of its said axis of oscillation and adapted to torsionally resist oscillation of said frame supported portion about said axis, each of said bodies having a pair of surfaces fixed against movement relative to said frame structure and one of said supported structures respectively.

9. In a motor vehicle having a frame structure and a steerable ground wheel disposed adjacent thereto, an axle structure swivelly mounting said wheel and extending inwardly therefrom in a direction transverse to the vehicle, an arm structure extending generally longitudinally of the vehicle and having an end portion thereof adapted to receive said axle structure, bearing means journalling said axle structure in said end portion and adapted to transmit thrust from said wheel to said arm structure in a direction transversely to the axis of said axle structure, said axle and arm structures having interengaged threaded portions for thrust transmission from said wheel to said arm structure in a direction axially of said axle structure, an upright member secured to said axle structure, a second arm structure pivoted to said frame structure and to said upright member, and means for pivotally mounting the first said arm structure on said frame structure.

10. In a motor vehicle having a longitudinally extending frame structure and a road wheel disposed adjacent one end of the frame structure, means associated with said wheel and frame structure for supporting and guiding said wheel for rising and falling movement independently of the remaining wheels of the vehicle, said supporting and guiding means including a tubular oscillatory wheel carrying arm structure having a hollow cylindrical frame supported portion extending generally transversely of said frame structure and a hollow portion offset from said frame supported portion in a direction generally longitudinally of said frame structure, a hollow cylindrical sleeve carried by an end of said offset hollow portion and extending transversely thereto, an axle member swivelly mounting said wheel and journalled in said sleeve, and a plurality of means for respectively swingingly mounting said axle member and said frame supported arm portion on said frame structure.

11. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a frame supported portion extending generally transversely of said frame structure, a torsionally active body of deformable material for mounting each of said supported portions on said frame structure to yieldingly resist oscillation of each supported portion about a common axis extending generally transversely of said frame structure and to yieldingly resist axial displacement of each supported portion inwardly along said axis, the inner ends of said supported portions being so disposed relatively to one another and said bodies being so spaced relative to each other that axial displacement of said supported portions as aforesaid is accommodated without accompanying thrust-transmission from either supported portion to the other supported portion or from either body to the other body.

12. In a motor vehicle having a frame structure comprising a pair of laterally spaced longitudinally extending side rail structures and a hollow cross member extending transversely of the vehicle and having its ends respectively structurally connected to said side rail structures, said vehicle having a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel-carrying arm structure having a frame supporting portion extending generally transversely of said side rail structures, a torsion spring for mounting each of said supporting portions on said frame structure for yieldingly resisting oscillation of each supporting portion about a common axis extending generally transversely of said side rail structures, each of said springs comprising a torsionally active annular body of deformable material having relatively movable surfaces adapted respectively for fixed connection to said frame structure and to one of said supporting portions, said cross member being recessed adjacent its opposite ends to receive said springs therein.

13. In a motor vehicle having a frame structure comprising a pair of laterally spaced longitudinally extending hollow side rail structures and a hollow cross member extending transversely of the vehicle and having its opposite ends respectively disposed in transversely overlapping relationship with said side rail structures for structural connection therewith, said vehicle having a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel-carrying arm structure having a frame supporting portion extending generally transversely of said side rail structures, a torsion spring for mounting each of said supporting portions on said frame structure for yieldingly resisting oscillation of each supporting portion about a common axis extending generally transversely of said side rail structures, each of said springs comprising a torsionally active annular body of deformable material having relatively movable surfaces adapted respectively for fixed connection to said frame structure and to one of said supporting portions, said opposite ends of said hollow cross member having portions thereof which arch upwardly above those portions of the bottom wall of said hollow side rail structures which lie adjacent said opposite ends, said springs being respectively disposed in said arched portions such that portions of said annular bodies are disposed above said bottom wall portions of said hollow side rail structures.

14. In a motor vehicle having a frame structure comprising a pair of laterally spaced longitudinally extending hollow side rail structures and a hollow cross member extending transversely of the vehicle and having its opposite ends respectively disposed in transversely overlapping relationship with said side rail structures for structural connection therewith, said vehicle having a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel-carrying arm structure having a frame supporting portion extending generally transversely of said side rail structures, a torsion spring for mounting each of said supporting portions on said frame structure for yieldingly resisting oscillation of each supporting portion about a common axis extending generally transversely of said side rail structures, each of said springs comprising a torsionally active annular body of deformable material having relatively movable surfaces adapted respectively for fixed connection to said frame structure and to one of said supporting portions, said hollow cross member comprising a pair of component members one of which is formed with a downwardly concaved recess for receiving said springs therein such that said springs are disposed at the region of overlapping between the ends of said cross member and said side rail structures.

15. In a motor vehicle having a frame structure comprising a pair of laterally spaced longitudinally extending side rail structures and a cross member extending therebetween, said vehicle having a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel-carrying arm structure having a frame supporting portion extending generally transversely of said side rail structures, a torsion spring for mounting each of said supporting portions on said frame structure for yieldingly resisting oscillation of each supporting portion about a common axis extending generally transversely of said side rail structures, each of said springs comprising a torsionally active annular body of deformable material having relatively movable surfaces adapted respectively for fixed connection to said frame structure and to one of said supporting portions, said cross member comprising a component element formed with a downwardly concaved recess for receiving said springs therein adjacent opposite ends of said recess, said cross member comprising a second component element attached to the first said component element and forming therewith a hollow cross-section for said cross member.

16. In a motor vehicle having a frame structure and a steerable ground wheel disposed adjacent thereto, an axle swively mounting said wheel and extending inwardly therefrom in a direction transverse of the vehicle, said axle having a cylindrical bearing part and a threaded bearing part, an arm structure extending generally longitudinally of the vehicle and having an end portion receiving said axle, anti-friction bearing means journalling said axle in said end portion and adapted to transmit thrust from said wheel to said arm structure in a direction transversely to the axis of said axle, and a hollow sleeve secured to said end portion and having internal threads engaged with said threaded bearing part for thrust transmission from said wheel to said arm structure in a direction axially of said axle, an upright member secured to said axle, a second arm structure pivoted to said frame structure and to said upright member, and means for pivotally mounting the first said arm structure on said frame structure.

17. In a motor vehicle having a longitudinally extending frame structure and a road wheel disposed adjacent one end of the frame structure, means associated with said wheel and frame structure for supporting and guiding said wheel for rising and falling movement independently of the remaining wheels of the vehicle, said supporting and guiding means including a tubular oscillatory wheel carrying arm structure extending from said frame structure and having a hollow end portion, a hollow cylindrical sleeve welded within said hollow end portion, an axle swively mounting said wheel and having axially spaced cylindrical and threaded bearing portions formed thereon, an anti-friction bearing between said sleeve and said cylindrical bearing portion, a second sleeve fixed within the first said sleeve and having internal threads engaged with the threads of said threaded bearing portion, and a plurality of means respectively swingingly mounting said axle and said arm structure on said frame structure.

HARRY T. WOOLSON.
    ALEXANDER G. HERRESHOFF.
    HAROLD A. HICKS.
    GLENN H. PARKER.